UNITED STATES PATENT OFFICE.

ABEL M. HAMBLET, OF WINCHESTER, MASSACHUSETTS.

PROCESS OF LEAVENING DOUGH AND BATTER.

1,236,428.  Specification of Letters Patent.  Patented Aug. 14, 1917.

No Drawing. Original application filed December 10, 1914, Serial No. 876,506. Divided and this application filed December 26, 1916. Serial No. 138,974.

*To all whom it may concern:*

Be it known that I, ABEL M. HAMBLET, a citizen of the United States, residing at Winchester, in the county of Middlesex and State of Massachusetts, have invented new and useful Improvements in Processes of Leavening Dough and Batter, of which the following is a specification.

My invention relates to the process of leavening dough and batter through the liberation of carbon dioxid in the mass by chemical reaction, and its principal purpose among other objects is to utilize in the reaction acid ingredients hitherto unavailable under the usual methods heretofore employed, thereby enabling the production of food preparations of improved quality and of reduced cost.

In my application for Letters Patent, Serial No. 876,506, I have stated that while previously it had been generally assumed by those skilled in the art that convenience and practical necessity required that acid leavening ingredients be prepared for use in dry form, such is not necessarily the case; but that, on the contrary, certain liquid compositions containing in solution acid substances which are not readily obtainable or available in concentrated dry form may be substituted and used for the purpose with facility and advantage, and that not all acid substances other than those obtainable in dry form are suitable for such use, nor can unlimited amounts of solvent be present without detriment.

My present application for Letters Patent relates to the process of using such substances in the leavening of dough and batter under conditions which permit the ready substitution of the same in rules, receipts and formulæ covering the use of cream of tartar, baking powder and other dry leavening ingredients and compositions.

This improved leavening process primarily consists in adding to the other ingredients of the dough or batter to be leavened, and causing to react in the mass, a salt or salts of carbonic acid and an acid composition of an acidity not less than the equivalent of a normal acid solution, composed wholly or in part of a solution of acid substances not readily obtainable in concentrated dry form; these acid substances, moreover, being acids, or derivatives of acids which have an "equivalent conductivity" (of electricity) not exceeding thirty in normal aqueous solution at eighteen degrees centigrade.

In the above specification of my improved process, the acidity of the composition to be used in liberating the carbon dioxid from the salt of carbonic acid is restricted to not less than the equivalent of a normal acid solution. This will be clearly intelligible to the manufacturing chemist or to anyone possessing a knowledge of chemical equivalents and volumetric analysis. If the composition were weaker in acidity than this minimum, such a volume would be required to liberate the quantity of carbon dioxid necessary for proper leavening that the process could not be substituted in cooking rules, receipts and formulæ specifying the use of baking powder, etc., without causing such a change in the consistency of the dough or batter as to impair the quality of the product, or without making substantial changes in other ingredients, the character and extent of which would be difficult to determine. By so limiting the acidity of said composition to that of a normal acid solution, I do not desire to be understood as meaning that the said acidity may not be weakened or lessened by reason of the admixture of the composition with any one or more of the ingredients used in making the dough or batter. So long as the acid composition is added, either to the mixture when all the ingredients have been brought together or to one or more of the ingredients at any time prior thereto, I regard the same as within the scope of my invention.

When I refer to acid ingredients not readily obtainable in dry form, I mean such substances as cannot be produced without chemical change in a stable, non-deliquescent, non-hygroscopic and dry solid form, or as can be so produced only through the use of absorbent agents. The process of using substances of this description, which fulfil also the other qualifications noted elsewhere herein, I have found to constitute an improvement in the art of leavening, since thereby food products may be obtained which possess in an increased degree the quality of seeming moist without being heavy or soggy so esteemed in the class of preparations for which baking powder is generally used, and which moreover, retain this quality longer than usual, so that the products do not as quickly become dry and stale. The extent of this very desirable improvement in quality varies according to the acid ingredients used and depends upon the ease of crystallization of the salts produced in the leavening reaction and in case of crystallization, on the number of molecules of water of crystallization which are included.

The "equivalent conductivity" (of electricity) of aqueous solutions, as the term is used in physical and electro-chemistry, is now generally recognized in the case of acids as a measure of the relative strength of the acids. It constitutes one of the best means at present available for distinguishing definitely the more active acids from the less corrosive, and is used for this purpose in this specification. I do not esteem it desirable that any acid of a strongly corrosive nature, as for example, hydrochloric acid, with an equivalent conductivity of approximately three hundred in normal aqueous solution at eighteen degrees centigrade, be used in liquid compositions for leavening purposes, for while the product of the reaction between such an acid and a salt of carbonic acid might be harmless, as in the case of hydrochloric acid and bicarbonate of soda, serious results might follow through accident or inadvertence, either through the mischance of internal administration or through the careless use of the acid through neglect to combine therewith an amount of some salt of carbonic acid sufficient to neutralize it completely when used for leavening purposes. On the other hand, I consider that acids which have an equivalent conductivity not exceeding thirty in normal aqueous solution at eighteen degrees centigrade are particularly adapted for use in liquid leavening compositions.

I do not wish to be understood as restricting myself in any broad claims to any particular acid composition or ingredient for use in my process, provided such acid is not susceptible of being reduced to dry form and has the conductivity not exceeding thirty as above set forth, but in illustration of the acid compositions which are especially adapted for use in my process, may be mentioned solutions of lactic acid, ($C_3H_6O_3$) and of lactic acid in conjunction with either or both of the derivatives, lactic anhydrid ($C_6H_{10}O_5$) and lactid ($C_{12}H_8O_4$).

As illustrations of the preferred application of my improved process of leavening, the following examples among others may be cited:—

*First, as a substitute for leavening with baking powder.*—In any cooking rule, receipt or formula specifying the use of a standard baking powder, omit the latter and add to the liquid ingredients a volume equal to that specified for baking powder of a solution of lactic acid or of lactic acid and lactic anhydrid, the total acidity of which is approximately equivalent to that of a thrice normal acid solution, and furthermore, mix with the dry ingredients a volume of bicarbonate of soda equal to one quarter of the volume of baking powder specified. Thereafter thoroughly mix and incorporate all of the ingredients.

*Second, as a substitute for leavening with cream of tartar.*—In any cooking rule, receipt or formula specifying the use of cream of tartar, omit the latter and add to the liquid ingredients double the volume, specified for cream of tartar, of a solution of lactic acid or of lactic acid and lactic anhydrid, the total acidity of which is approximately equivalent to that of a thrice normal acid solution. Mix with the dry ingredients the same volume of bicarbonate of soda as specified for use with the cream of tartar. Thereafter thoroughly mix and incorporate all of the ingredients.

In the two examples above cited, of course, without altering the essentials of my process twice the volume of a solution half as strong as that specified could be used, or one half the volume of a solution twice as strong. Furthermore, if water or milk were required in the production of the dough or batter, the acid composition could be added to the same at any time preliminary to assembling and mixing with the other ingredients, without departing from the essential practice of the process. Moreover, while I consider that in order to secure the best results the acid composition should be added to all or part of the liquid ingredients of the batter previous to the incorporation of the same with the solid ingredients, and that similarly the salt or salts of carbonic acid used should be mixed with the solid ingredients before the addition of the liquid, still the process of leavening could be carried out by any procedure of mixing solid and liquid ingredients, provided the acid composition and the salt of carbonic acid were permitted to react together only in the mass of the dough or batter.

What I claim and desire to secure by Letters Patent is:

1. The process of leavening dough and batter consisting in mixing with other essential ingredients of the mass and causing to react in the mass, a salt of carbonic acid, and a composition of an acidity not less than the equivalent of a normal acid solution, which composition contains an acid ingredient which has an equivalent conductivity (of electricity) not exceeding thirty in normal aqueous solution at eighteen degrees centigrade, and which cannot be reduced to dry form in the absence of absorbent substances.

2. The process of leavening dough and batter consisting in mixing with other essential ingredients of the mass and causing to react only in the mass through contact solely therein, a salt of carbonic acid and a composition of an acidity not less than the equivalent of a normal acid solution, which composition contains an acid ingredient which has an equivalent conductivity (of electricity) not exceeding thirty in normal aqueous solution at eighteen degrees centigrade, and which cannot be reduced to dry form in the absence of absorbent substances.

3. The process of leavening dough and batter consisting in mixing with other essential ingredients of the mass and causing to react in the mass, a salt of carbonic acid, and a liquid composition of an acidity not less than the equivalent of a normal acid solution, which composition contains an acid ingredient which has an equivalent conductivity (of electricity) not exceeding thirty in normal aqueous solution at eighteen degrees centigrade, and which cannot be reduced to dry form in the absence of absorbent substances.

4. The process of leavening dough and batter consisting in mixing with other essential ingredients of the mass and causing to react only in the mass through contact solely therein, a salt of carbonic acid, and a liquid composition of an acidity not less than the equivalent of a normal acid solution, which composition contains an acid ingredient which has an equivalent conductivity (of electricity) not exceeding thirty in normal aqueous solution at eighteen degrees centigrade, and which cannot be reduced to dry form in the absence of absorbent substances.

5. The process of leavening dough and batter consisting in mixing with other essential ingredients of the mass and causing to react in the mass, a salt of carbonic acid, and a composition which contains lactic acid and which is of an acidity not less than the equivalent of a normal acid solution.

6. The process of leavening dough and batter consisting in mixing with other essential ingredients of the mass and causing to react only in the mass, through contact solely therein, a salt of carbonic acid, and a composition which contains lactic acid and which is of an acidity not less than the equivalent of a normal acid solution.

7. The process of leavening dough and batter consisting in mixing with other essential ingredients of the mass and causing to react in the mass, a salt of carbonic acid, and a liquid composition which contains lactic acid and which is of an acidity not less than the equivalent of a normal acid solution.

8. The process of leavening dough and batter consisting in mixing with other essential ingredients of the mass and causing to react only in the mass, through contact solely therein, a salt of carbonic acid, and a liquid composition which contains lactic acid and which is of an acidity not less than the equivalent of a normal acid solution.

9. The process of leavening dough and batter consisting in mixing with other essential ingredients of the mass and causing to react in the mass, a salt of carbonic acid, and a composition which contains lactic acid and lactic anhydrid and which is of an acidity not less than the equivalent of a normal acid solution.

10. The process of leavening dough and batter consisting in mixing with other essential ingredients of the mass and causing to react only in the mass, through contact solely therein, a salt of carbonic acid, and a composition which contains lactic acid and lactic anhydrid and which is of an acidity not less than the equivalent of a normal acid solution.

11. The process of leavening dough and batter consisting in mixing with other essential ingredients of the mass and causing to react in the mass, a salt of carbonic acid, and a liquid composition which contains lactic acid and lactic anhydrid, and which is of an acidity not less than the equivalent of a normal acid solution.

12. The process of leavening dough and batter consisting in mixing with other essential ingredients of the mass and causing to react only in the mass, through contact solely therein, a salt of carbonic acid, and a liquid composition which contains lactic acid and lactic anhydrid, and which is of an acidity not less than the equivalent of a normal acid solution.

In testimony whereof I have hereunto set my hand in presence of two subscribing witnesses, this 22nd day of December, 1916.

ABEL M. HAMBLET.

Witnesses:
 GEO. B. DE LUCA,
 ALVINA H. GRABAU.